United States Patent
Ishida et al.

(10) Patent No.: US 9,964,910 B2
(45) Date of Patent: May 8, 2018

(54) DRIVE TRANSMISSION UNIT AND IMAGE FORMING APPARATUS INCORPORATING SAME

(71) Applicants: Masahiro Ishida, Kanagawa (JP); Naoki Matsuda, Kanagawa (JP)

(72) Inventors: Masahiro Ishida, Kanagawa (JP); Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 5 days.

(21) Appl. No.: 14/662,401

(22) Filed: Mar. 19, 2015

(65) Prior Publication Data
US 2015/0277337 A1    Oct. 1, 2015

(30) Foreign Application Priority Data

Mar. 25, 2014  (JP) ................. 2014-062083
Jan. 16, 2015  (JP) ................. 2015-006718

(51) Int. Cl.
*G03G 15/00* (2006.01)
*G03G 15/09* (2006.01)
(Continued)

(52) U.S. Cl.
CPC ....... *G03G 15/757* (2013.01); *F16H 57/0006* (2013.01); *F16H 1/20* (2013.01);
(Continued)

(58) Field of Classification Search
CPC ............. G03G 15/757; G03G 15/0935; G03G 15/1615; G03G 15/5008; G03G 21/1857;
(Continued)

(56) References Cited

U.S. PATENT DOCUMENTS

| 4,397,692 A | 8/1983 | Ramge et al. |
| 5,058,546 A | 10/1991 | Lawrence |

(Continued)

FOREIGN PATENT DOCUMENTS

| JP | S59500381 A | 3/1984 |
| JP | 62-184171 | 11/1987 |

(Continued)

OTHER PUBLICATIONS

Japanese Office Action dated Nov. 24, 2016.

*Primary Examiner* — Joseph S Wong
(74) *Attorney, Agent, or Firm* — Harness, Dickey & Pierce, P.L.C.

(57) ABSTRACT

A drive transmission unit is described that includes a drive source, and a rotatable drive transmitting member to transmit a driving force from the drive source. The drive transmitting member includes a bottom part intersecting an axis of the drive transmitting member, a circular transmitting part extending from the bottom part in an axial direction of the drive transmitting member and including an internal toothed surface on an inner circumferential surface of the transmitting part to mesh with a first member, and a first projecting part and a second projecting part projecting in opposite directions from the bottom part along the axial direction of the drive transmitting member and having different diameters.

11 Claims, 4 Drawing Sheets

(51) Int. Cl.
  *G03G 15/16* (2006.01)
  *G03G 21/18* (2006.01)
  *F16H 57/00* (2012.01)
  *F16H 1/20* (2006.01)

(52) U.S. Cl.
  CPC ..... *G03G 15/0935* (2013.01); *G03G 15/1615* (2013.01); *G03G 15/5008* (2013.01); *G03G 21/186* (2013.01); *G03G 21/1857* (2013.01); *Y10T 74/19102* (2015.01); *Y10T 74/19647* (2015.01)

(58) Field of Classification Search
  CPC ..... G03G 21/186; F16H 57/0006; F16H 1/20; Y10T 74/19102; Y10T 74/19647
  See application file for complete search history.

(56) References Cited

U.S. PATENT DOCUMENTS

| | | |
|---|---|---|
| 5,927,148 A | 7/1999 | Yamanaka et al. |
| 2013/0260952 A1* | 10/2013 | Matsuda ............... F16H 57/082 475/346 |
| 2014/0123796 A1 | 5/2014 | Ishida et al. |
| 2014/0270851 A1 | 9/2014 | Matsuda et al. |

FOREIGN PATENT DOCUMENTS

| | | |
|---|---|---|
| JP | H08248822 A | 9/1996 |
| JP | 11-311302 | 11/1999 |
| JP | 3079189 U | 8/2001 |
| JP | 2014-169723 | 9/2014 |

* cited by examiner

DRIVE TRANSMISSION UNIT AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application Nos. 2014-062083, filed on Mar. 25, 2014, and 2015-006718, filed on Jan. 16, 2015, in the Japan Patent Office, the entire disclosure of each of which is hereby incorporated by reference herein.

BACKGROUND

Technical Field

Embodiments of this disclosure generally relate to a drive transmission unit and an image forming apparatus incorporating the drive transmission unit.

Background Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor serving as an image carrier. An optical writer irradiates the surface of the photoconductor thus charged with a light beam to form an electrostatic latent image on the surface of the photoconductor according to the image data. A developing device supplies toner to the electrostatic latent image thus formed to render the electrostatic latent image visible as a toner image. The toner image is then transferred onto a recording medium directly, or indirectly via an intermediate transfer belt. Finally, a fixing device applies heat and pressure to the recording medium carrying the toner image to fix the toner image onto the recording medium.

Such image forming apparatuses may incorporate a number of drivers and drive transmission units to operate the photoconductor, the transfer belt, and the like.

SUMMARY

In one embodiment of this disclosure, a novel drive transmission unit is described that includes a drive source, and a rotatable drive transmitting member to transmit a driving force from the drive source. The drive transmitting member includes a bottom part intersecting an axis of the drive transmitting member, a circular transmitting part extending from the bottom part in an axial direction of the drive transmitting member and including an internal toothed surface on an inner circumferential surface of the transmitting part to mesh with a first member, and a first projecting part and a second projecting part projecting in opposite directions from the bottom part along the axial direction of the drive transmitting member and having different diameters.

Also described is an image forming apparatus incorporating the drive transmission unit.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein.

Figure 1:
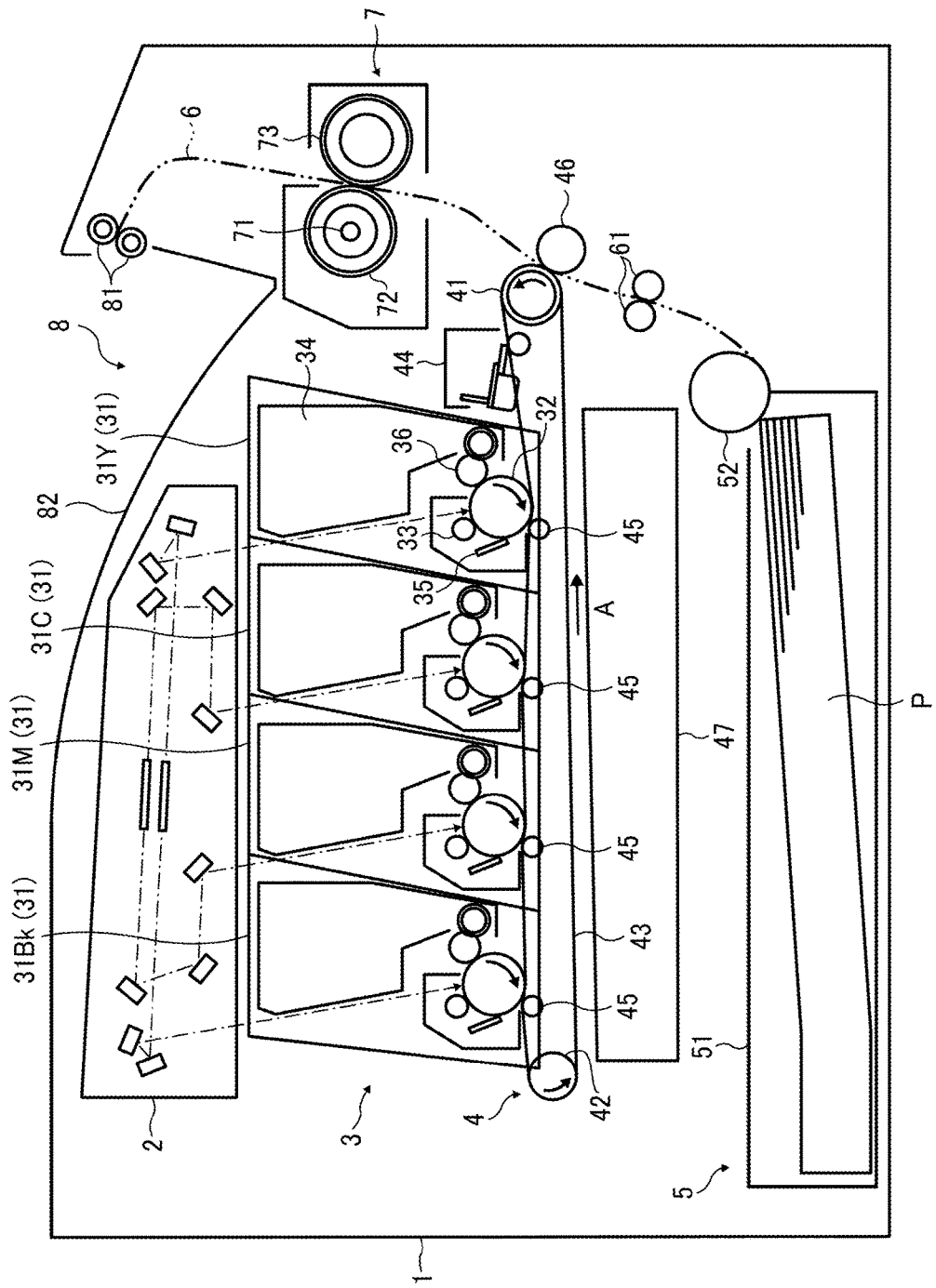
FIG. 1 is a schematic sectional view of an image forming apparatus according to an embodiment.

The accompanying drawings are intended to depict embodiments of this disclosure and should not be interpreted to limit the scope thereof.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the invention and not all of the components or elements described in the embodiments of this disclosure are indispensable.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

It is to be noted that, in the following description, suffixes Y, C, M, and Bk denote colors yellow, cyan, magenta, and black, respectively. To simplify the description, these suffixes are omitted unless necessary.

Referring now to the drawings, wherein like reference numerals designate identical or corresponding parts throughout the several views, embodiments of this disclosure are described below.

Initially with reference to FIG. 1, a description is given of an image forming apparatus 1 according to an embodiment of this disclosure. FIG. 1 is a schematic sectional view of the image forming apparatus 1.

As illustrated in FIG. 1, the image forming apparatus 1 includes, e.g., an exposure device 2, an image forming device 3, a transfer device 4, a sheet feeder 5, a conveyance passage 6, a fixing device 7, and an ejection device 8.

The exposure device 2 is positioned in an upper portion of the image forming apparatus 1, and includes a light source that emits, e.g., laser beams and various optical systems. Specifically, the exposure device 2 irradiates a photoconductor 32 of the image forming device 3, described later, with laser beams for each color separation component of an image created according to image data received from an image acquisition device, thereby exposing the surface of the photoconductor 32.

The image forming device 3 is positioned below the exposure device 2, and includes a plurality of process cartridges 31 removable from the image forming apparatus 1. Each of the process cartridges 31 includes, e.g., a drum-shaped photoconductor 32 capable of bearing toner as developer on its surface, a charging roller 33 that uniformly charges the surface of the photoconductor 32, a developing device 34 that supplies toner to the surface of the photoconductor 32, and a photoconductor cleaning blade 35 that cleans the surface of the photoconductor 32.

The process cartridges 31 includes four process cartridges 31Y, 31C, 31M, and 31Bk for four different colors of yellow, cyan, magenta, and black, respectively, which are color separation components of a color image. The four process cartridges 31 are identical in configuration, differing only in the color employed. To simplify the description, these suffixes are omitted unless necessary.

The transfer device 4 is positioned under the image forming device 3. The transfer device 4 includes, e.g., a drive roller 41, a driven roller 42, an endless intermediate transfer belt 43 entrained rotatably around the drive roller 41 and the driven roller 42, a cleaning blade 44 that cleans an outer circumferential surface of the intermediate transfer belt 43, four primary transfer rollers 45 facing the respective photoconductors 32 of the process cartridges 31 via the intermediate transfer belt 43, and a secondary transfer roller 46. Each of the four primary transfer rollers 45 presses an inner circumferential surface of the intermediate transfer belt 43 against the corresponding photoconductor 32 to form a contact area called a primary transfer nip between the intermediate transfer belt 43 and the photoconductor 32.

The secondary transfer roller 46 faces the drive roller 41 via the intermediate transfer belt 43, and presses the outer circumferential surface of the intermediate transfer belt 43 against the drive roller 41 to form a contact area called a secondary transfer nip between the intermediate transfer belt 43 and the secondary transfer roller 46.

A waste toner container 47 is disposed below the intermediate transfer belt 43 to receive, through a waste toner conveying tube, waste toner removed from the intermediate transfer belt 43 by the cleaning blade 44.

The sheet feeder 5 is positioned in a lower portion of the image forming apparatus 1, and includes, e.g., a tray 51 that accommodates recording media P, and a sheet feeding roller 52 that picks up the recording media P from the tray 51.

The recording media P are conveyed through the conveyance passage 6 from the sheet feeder 5 toward the ejection device 8. Pairs of conveyance rollers including a pair of registration rollers 61 are disposed along the conveyance passage 6.

The fixing device 7 includes, e.g., a heater 71, a fixing roller 72 heated by the heater 71, and a pressing roller 73 capable of pressing the fixing roller 72.

The ejection device 8 is disposed at the most downstream position of the conveyance passage 6. The ejection device 8 includes a pair of ejection rollers 81 that ejects the recording media P outside, and an ejection tray 82 that receives the recording media P ejected by the pair of ejection rollers 81.

With continued reference to FIG. 1, a description is now given of a basic image forming operation of the image forming apparatus 1.

When a print job starts, electrostatic latent images are formed on the surfaces of the photoconductors 32 of the process cartridges 31Y, 31C, 31M, and 31Bk, according to single color image data, that is, yellow, cyan, magenta, and black image data, respectively, generated by color separation of a desired full-color image. The developing devices 34 supply toner to the electrostatic latent images thus formed on the photoconductors 32 with the developing rollers 36, to render the electrostatic latent images visible as toner images.

The drive roller 41 of the transfer device 4 rotates in a counterclockwise direction in FIG. 1 to rotate the intermediate transfer belt 43 in a direction indicated by arrow A. A power supply applies a constant voltage or a constant current control voltage having a polarity opposite a polarity of the toner to the primary transfer rollers 45 to generate a transfer electric field at each primary transfer nip between the primary transfer roller 45 and the corresponding photoconductor 32. The transfer electric fields generated at the primary transfer nips transfer the yellow, magenta, cyan, and black toner images from the photoconductors 32 onto the intermediate transfer belt 43 so that the yellow, magenta, cyan, and black toner images are superimposed successively on the intermediate transfer belt 43. Thus, a full-color toner image is formed on the outer circumferential surface of the intermediate transfer belt 43. The photoconductor cleaning blade 35 removes residual toner, which fails to be transferred to the intermediate transfer belt 43 and therefore remains on the photoconductors 32, from the photoconductors 32. The waste toner container 47 receives such residual toner.

In the meantime, when the print job starts, the sheet feeding roller 52 of the sheet feeder 5 disposed in the lower portion of the image forming apparatus 1 is rotated to feed a recording medium P from the tray 51 toward the pair of registration rollers 61 through the conveyance passage 6. Then, the pair of registration rollers 61 feeds the recording medium P toward the secondary transfer nip between the secondary transfer roller 46 and the drive roller 41 at a predetermined time.

A transfer voltage having a polarity opposite a polarity of the charged toner contained in the full-color toner image formed on the intermediate transfer belt 43 is applied to the secondary transfer roller 46, thereby generating a transfer electric field to transfer the full-color toner image onto the recording medium P from the intermediate transfer belt 43 at the secondary transfer nip. More specifically, yellow, magenta, cyan, and black toner images are transferred onto the recording medium P from the intermediate transfer belt 43 at once.

The cleaning blade 44 removes residual toner, which fails to be transferred to the recording medium P and therefore remains on the intermediate transfer belt 43, from the intermediate transfer belt 43. The waste toner container 47 receives such residual toner, e.g., by a screw and through the toner conveying tube.

The recording medium P bearing the full-color toner image is conveyed to the fixing device 7. The fixing device 7 applies heat and pressure to the recording medium P with the fixing roller 72 heated by the heater 71 and the pressing roller 73, thereby fixing the full-color toner image onto the recording medium P. The recording medium P is separated from the fixing roller 72 after the full-color toner image is fixed onto the recording medium P, and conveyed by a pair of conveyance rollers toward the pair of ejection rollers 81 of the ejection device 8. Then, the pair of ejection rollers 81 ejects the recording medium P onto the ejection tray 82.

Thus, the operation of forming a full-color image on the recording medium P is conducted. Alternatively, the image forming operation may be conducted using any one of the process cartridges 31Y, 31C, 31M, and 31Bk to form a monochrome image, or using two or three process cartridges 31 to form a two or three-color image, respectively.

Usually, such image forming apparatuses include drivers and drive transmission units that transmit driving forces from the drivers, to drive components of the image forming apparatuses to conduct predetermined operations such as rotating photoconductors, sheet feeding, and image reading, during image forming processes.

However, vibration of such drivers may be also transmitted, which may adversely affect image quality and cause noise problems. Specifically, the image forming apparatuses include a number of internal components mechanically connected to each other. When receiving driving forces from the drivers, the internal components vibrate and generate noise.

Figure 7:
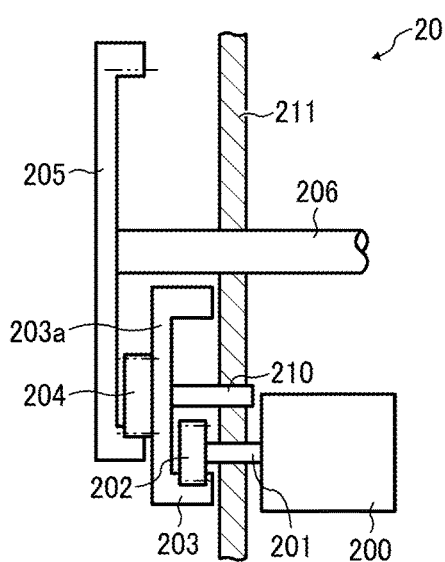
FIG. 7 is a schematic sectional view of a comparative drive transmission unit.

To reduce such noise, for example, a comparative drive transmission unit 20 shown in FIG. 7 includes a motor 200, a drive shaft 201 connected to the motor 200, a first external gear 202, a first internal gear 203, a top surface 203a, a second external gear 204, a second internal gear 205, an ejection roller shaft 206, a shaft 210, and a frame 211. As the motor 200 rotates, the first external gear 202 rotates about the drive shaft 201, thereby transmitting a driving force to the first internal gear 203 meshing with the first external gear 202. As the first internal gear 203 rotates about the shaft 210, the second external gear 204 rotate. Since the second external gear 204 meshes with the second internal gear 205, the second internal gear 205 rotates about the ejection roller shaft 206. Accordingly, the driving force is transmitted to the ejection roller shaft 206.

The external gears (first and second external gears 202 and 204) mesh with the internal gears (first and second internal gears 203 and 205), respectively, harder than external gears meshing with each other. Accordingly, the driving force is stably transmitted.

In addition, meshing faces between the external gears and the internal gears are covered by the first internal gear 203 and the frame 211 or by the second internal gear 205 and the top surface 203a of the first internal gear 203, thereby containing noise at the meshing faces.

However, in the comparative drive transmission unit 20, the rotating internal gears are not fixed except at their inner circumferential surfaces meshing with the external gears. Therefore, the internal gears have relatively low vibration resistance, and may easily vibrate when receiving the driving force. Relatively large vibration of the internal gears may hamper the internal gears from accurately transmitting the driving force to other components such as an ejection roller. In addition, vibration of the internal gears may generate relatively loud noise.

By contrast, drive transmission units according to embodiments of this disclosure accurately transmit a driving force while reducing noise.

The following describes such drive transmission units according to embodiments of this disclosure.

Figure 2A:
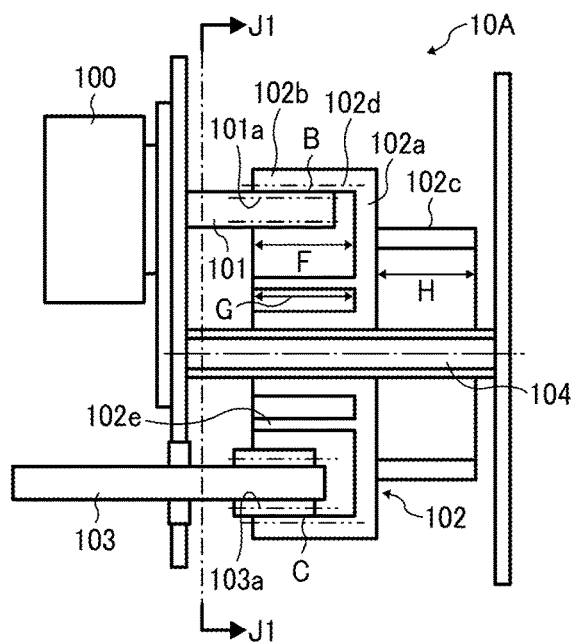
FIG. 2A is a schematic sectional view of a drive transmission unit according to a first embodiment.
Figure 2B:
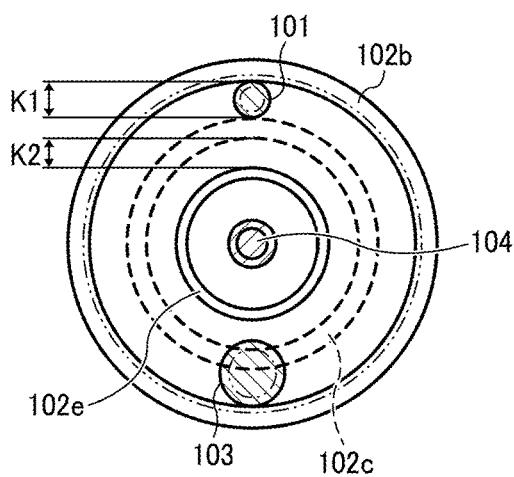
FIG. 2B is a vertical sectional view of the drive transmission unit along a line shown in FIG. 2A.

Referring now to FIGS. 2A and 2B, a description is given of a drive transmission unit 10A according to a first embodiment. FIG. 2A is a schematic sectional view of the drive transmission unit 10A.

The drive transmission unit 10A includes, e.g., a motor 100 serving as a driver source, a motor gear 101, which is a motor shaft, serving as a first member, a drive transmitting member 102, a first output gear 103, and a rotary shaft 104 as a shaft of the drive transmitting member 102. A driving force of the motor 100 is transmitted to the first output gear 103 via the motor gear 101 and the drive transmitting member 102, and further transmitted to a driving target.

The drive transmitting member 102 includes a bottom part 102a, a circular transmitting part 102b, and circular stiffening ribs 102c and 102e serving as projecting parts. The bottom part 102a is intersected by the rotary shaft 104. The transmitting part 102b extends from the bottom part 102a axially along the rotary shaft 104, which is a shaft of the drive transmitting member 102, while coaxial with the rotary shaft 104. The stiffening ribs 102c and 102e are also coaxial with the rotary shaft 104, while projecting from the bottom part 102a axially along the rotary shaft 104 in opposite directions. The stiffening ribs 102c and 102e have different diameters from each other.

The diameters of the transmitting part 102b, the stiffening rib 102c, and the stiffening rib 102e, each coaxial with the rotary shaft 104 are transmitting part 102b>stiffening rib 102c>stiffening rib 102e.

FIG. 2B is a vertical sectional view of the drive transmission unit 10A along a line J1 shown in FIG. 2A. As shown in FIG. 2B, the stiffening rib 102c is positioned between the transmitting part 102b and the stiffening rib 102e in an arbitrary direction on a plane (i.e., sheet face of FIG. 2B) perpendicular to an axial direction of the rotary shaft 104. In other words, the transmitting part 102b, the stiffening rib 102c, and the stiffening rib 102e are dimensioned so that K1 and K2 are equal, where, as shown in FIG. 2B, the K1 is a difference between an inner diameter of the transmitting part 102b and an outer diameter of the stiffening rib 102c, and the K2 is a difference between an inner diameter of the stiffening rib 102c and an outer diameter of the stiffening rib 102e.

The transmitting part 102b includes an internal toothed surface 102d on its inner circumferential surface to mesh with other members such as the motor gear 101 and the first output gear 103. The motor gear 101 and the first output gear 103 serve as first members that mesh with the internal toothed surface 102d. Specifically, the internal toothed surface 102d meshes with a tooth part 101a provided on an outer circumferential surface of the motor gear 101, via a meshing face B. At the same time, the internal toothed surface 102d meshes with a tooth part 103a provided on an outer circumferential surface of the first output gear 103, via a meshing face C. The meshing faces B and C face each other with the rotary shaft 104 interposed therebetween.

The driving force of the motor 100 is transmitted to the motor gear 101, and further transmitted to the transmitting part 102b of the drive transmitting member 102 via the meshing face B. Receiving the driving force, the drive transmitting member 102 rotates about the rotary shaft 104 to transmit the driving force to the first output gear 103 via the meshing face C.

The stiffening ribs 102c and 102e strengthen the drive transmitting member 102, and suppress vibration of the drive transmitting member 102 while the drive transmitting member 102 is rotating about the rotary shaft 104 to transmit the driving force to the first output gear 103.

As described above, the stiffening ribs 102c and 102e have different diameters from each other. If the stiffening ribs 102c and 102e had the same diameter, stress would concentrate at the bases of the stiffening ribs 102c and 102e and weaken them as the drive transmitting member 102 vibrates. In such a case, the stiffening ribs 102c and 102e might not sufficiently strengthen the drive transmitting member 102.

By contrast, in the present embodiment, the stiffening ribs 102c and 102e have different diameters from each other to strengthen the drive transmitting member 102 sufficiently to suppress the vibration of the drive transmitting member 102.

Reducing the vibration of the drive transmitting member 102 allows the drive transmitting member 102 to accurately transmit the driving force, while reducing noise.

More specifically, after receiving the driving force from the motor 100 via the motor gear 101, the drive transmitting member 102 accurately transmits the driving force to the first output gear 103 because the vibration of the drive transmitting member 102 is suppressed. Reduction of the vibration of the drive transmitting member 102 reduces noise.

In the present embodiment, the bottom part 102a and the transmitting part 102b cover the meshing faces B and C. Accordingly, noise generated from the meshing faces B and C is contained, thereby reducing noise.

As shown in FIG. 2A, the meshing faces B and C face each other with the rotary shaft 104 interposed therebetween. In other words, the drive transmitting member 102 has meshing faces on both sides (i.e., upper and lower sides in FIG. 2A). Thus, the vibration of the drive transmitting member 102 is suppressed more efficiently than a drive transmitting member having only one side provided with a meshing face and the other side unfixed.

In FIG. 2A, H represents a width of the stiffening rib 102c axially along the rotary shaft 104. Similarly, G represents a width of the stiffening rib 102e axially along the rotary shaft 104. F represents a face width of the internal toothed surface 102d. In the present embodiment, the width H or the width H+G is longer than the face width F. The internal toothed surface 102d receives vibration from the motor gear 101 in the face width F. The vibration is then transmitted to the stiffening ribs 102c and 102e positioned inward from the internal toothed surface 102d. Accordingly, the stiffening ribs 102c and 102e also vibrate. The width H+G is longer than the face width F and sufficient to reduce vibration that the stiffening ribs 102c and 102e receive per unit width, thereby strengthening the drive transmitting member 102.

In addition, each of the stiffening ribs 102c and 102e has a sufficient width to reduce a relative length of the internal toothed surface 102d projecting from the bottom part 102a, resulting in low inclination. Accordingly, the inclination of the internal toothed surface 102d is reduced when the drive transmitting member 102 vibrates while rotating about the rotary shaft 104.

In the present embodiment, the height (i.e., width) G of the stiffening rib 102e is equal to the height F of the transmitting part 102b (i.e., face width of the internal toothed surface 102d). Alternatively, the height G may be shorter than the height F.

Figure 3:
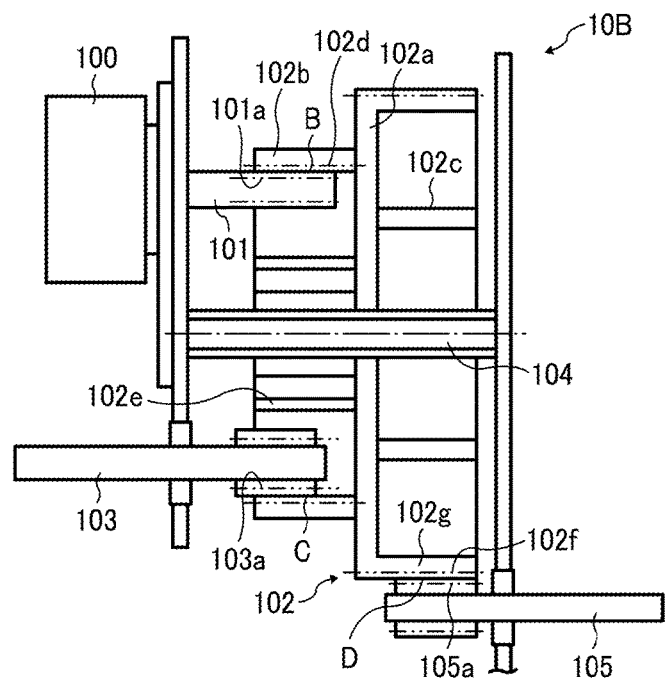
FIG. 3 is a schematic sectional view of a drive transmission unit according to a second embodiment.

Referring now to FIG. 3, a description is given of a drive transmission unit 10B according to a second embodiment. FIG. 3 is a schematic sectional view of the drive transmission unit 10B.

In the second embodiment, the drive transmission unit 10B includes a drive transmitting member 102 that includes a circular peripheral wall 102g. The peripheral wall 102g is coaxial with a rotary shaft 104, while projecting from a bottom part 102a in a direction opposite a direction in which a transmitting part 102b projects from the bottom part 102a. The peripheral wall 102g has a larger diameter than the transmitting part 102b, the circular stiffening rib 102c and the circular stiffening rib 102e. The peripheral wall 102g serves as an outer circumferential surface of the drive transmitting member 102.

In addition, the peripheral wall 102g includes an external toothed surface 102f on its outer circumferential surface. The drive transmission unit 10B also includes a second output gear 105 serving as a second member that meshes with the external toothed surface 102f. The external toothed surface 102f meshes with a tooth part 105a provided on an outer circumferential surface of the second output gear 105, via a meshing face D. The meshing face D between the drive transmitting member 102 and the second output gear 105 faces a meshing face B between the drive transmitting member 102 and a motor gear 101 with the rotary shaft 104 interposed therebetween.

In the drive transmission unit 10B, the drive transmitting member 102 transmits a driving force from a motor 100 to both a first output gear 103 and the second output gear 105. In addition, the drive transmitting member 102 has meshing faces having tooth parts on its inner and outer circumferential surfaces.

Figure 4:
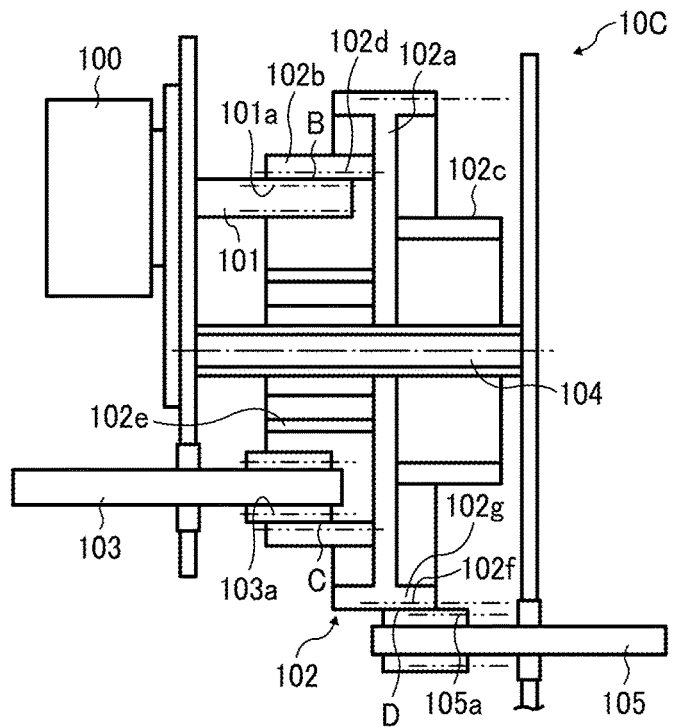
FIG. 4 is a schematic sectional view of a drive transmission unit according to a third embodiment.

Referring now to FIG. 4, a description is given of a drive transmission unit 10C according to a third embodiment. FIG. 4 is a schematic sectional view of the drive transmission unit 10C.

In the third embodiment, the drive transmission unit 10C includes a drive transmitting member 102 that includes a circular peripheral wall 102g. The peripheral wall 102g is coaxial with a rotary shaft 104, while projecting from a bottom part 102a in opposite directions axially along the rotary shaft 104.

The peripheral wall 102g has an external toothed surface 102f. The bottom part 102a is located in the center of the external toothed surface 102f in an axial direction of the rotary shaft 104. Accordingly, when the external toothed surface 102f and a tooth part 105a mesh via a meshing face D and generate vibration, the vibration is transmitted equally in the opposite directions from the bottom part 102a axially along the rotary shaft 104. As a result, vibration of the drive transmitting member 102 is kept stable, and therefore, the drive transmitting member 102 accurately transmits the driving force from a motor 100.

Figure 5:
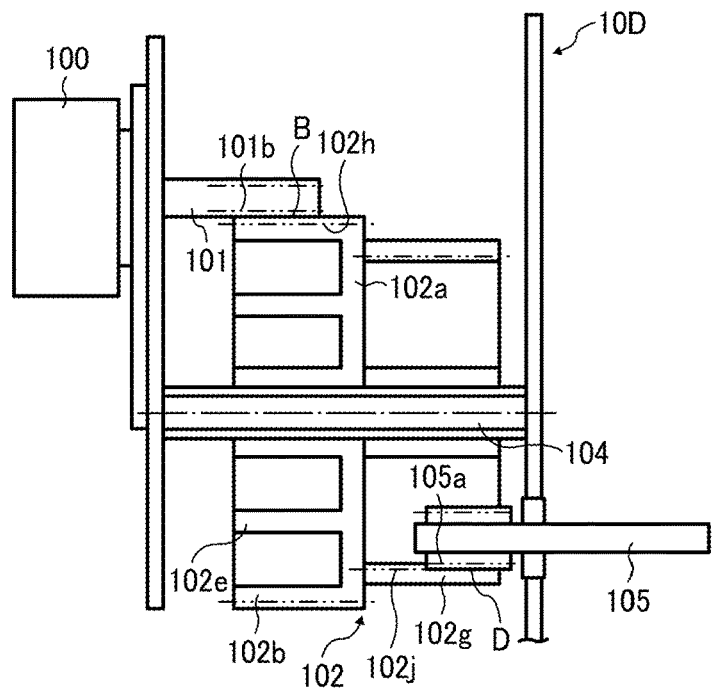
FIG. 5 is a schematic sectional view of a drive transmission unit according to a fourth embodiment.

Referring now to FIG. 5, a description is given of a drive transmission unit 10D according to a fourth embodiment. FIG. 5 is a schematic sectional view of the drive transmission unit 10D.

In the fourth embodiment, the drive transmission unit 10D includes a drive transmitting member 102 that includes a transmitting part 102b. The transmitting part 102b has an external toothed surface 102h on its outer circumferential surface. The external toothed surface 102h meshes with a tooth part 101b provided on an inner circumferential surface of a motor gear 101 via a meshing face B. The drive transmitting member 102 also includes a peripheral wall 102g that has an internal toothed surface 102j on its inner circumferential surface. The internal toothed surface 102j meshes with a tooth part 105a provided on an outer circumferential surface of a second output gear 105 via a meshing face D. Thus, unlike the first through third embodiments, the motor gear 101 has a tooth part on its inner circumferential surface, the transmitting part 102b has an external toothed surface, and the peripheral wall 102g has an internal toothed surface.

In the fourth embodiment, the peripheral wall 102g is a circular projecting part. In other words, the peripheral wall 102g is coaxial with a rotary shaft 104, while projecting from a bottom part 102a axially along the rotary shaft 104. As described above, the peripheral wall 102g has the internal toothed surface 102j. Accordingly, the peripheral wall 102g serves as a transmitting part that transmits a driving force. As shown in FIG. 5, the peripheral wall 102g has a larger diameter than a stiffening rib 102e, which is also a circular projecting part coaxial with the rotary shaft 104 while projecting from the bottom part 102a.

In the fourth embodiment, the drive transmission unit 10D does not include a first output gear 103. Alternatively, as in the third embodiment, the drive transmission unit 10D may include the first output gear 103 that faces the motor gear 101 with the rotary shaft 104 interposed therebetween, to mesh with the drive transmitting member 102. In such a case, a tooth part 103a of the first output gear 103 meshes with the external toothed surface 102h, instead of the internal toothed surface 102d of the drive transmitting member 102 described above in the first embodiment, for example.

Figure 6A:
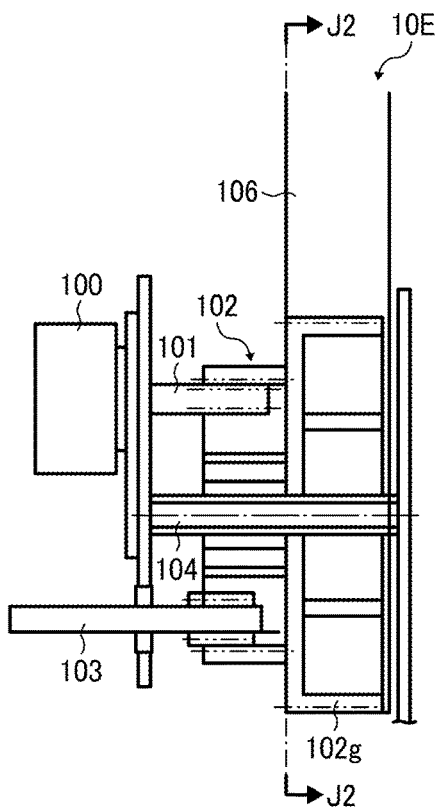
FIG. 6A is a schematic sectional view of a drive transmission unit according to a fifth embodiment.
Figure 6B:
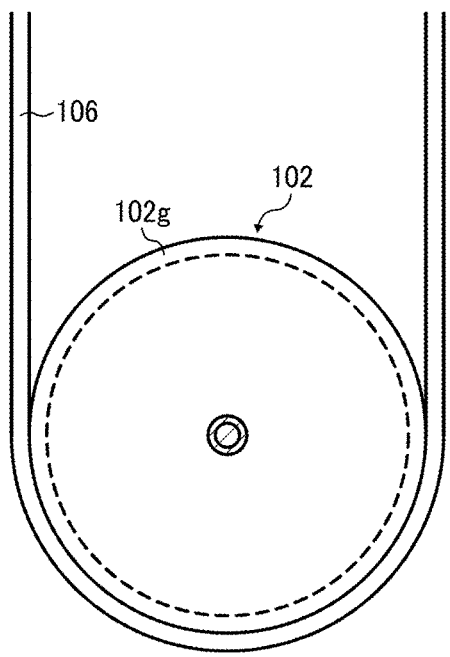
FIG. 6B is a vertical sectional view of the drive transmission unit along a line shown in FIG. 6A.

Referring now to FIGS. 6A and 6B, a description is given of a drive transmission unit 10E according to a fifth embodiment. FIG. 6A is a schematic sectional view of the drive transmission unit 10E. FIG. 6B is a vertical sectional view of the drive transmission unit 10E along a line J2 shown in FIG. 6A.

In the fifth embodiment, the drive transmission unit 10D includes a drive transmitting member 102 that includes a peripheral wall 102g. Although the peripheral wall 102g does not have either the external toothed surface 102f or the internal toothed surface 102j as described above, a belt 106 is wound around the peripheral wall 102g. The belt 106 is also wound around a driving target on a side (upper side in FIGS. 6A and 6B) opposite the peripheral wall 102g.

As the drive transmitting member 102 rotates about a rotary shaft 104, the peripheral wall 102g also rotates about the rotary shaft 104, thereby transmitting a driving force to the driving target via the belt 106.

According to the above-described embodiments, a drive transmission unit (e.g., drive transmission unit 10A) includes a drive transmitting member (e.g., drive transmitting member 102). The drive transmitting member includes a bottom part (e.g., bottom part 102a) and a circular transmitting part (e.g., transmitting part 102b) that includes an internal toothed surface (internal toothed surface 102d). The internal toothed surface meshes with another member (e.g., motor gear 101) via a meshing face (e.g., meshing face B) to transmit a driving force. The meshing face is surrounded by the transmitting part and the bottom part to contain vibration. The drive transmitting member also includes circular projecting parts projecting from the bottom part in opposite directions along an axial direction of the drive transmitting member, to stiffen the drive transmitting member and dampen vibration of the drive transmitting member. The circular projecting parts have different diameters to prevent stress from concentrating at the projecting parts, thereby strengthening the drive transmitting member and suppressing vibration of the drive transmitting member. Accordingly, the drive transmission unit accurately transmits the driving force while reducing noise.

It is to be noted that the number of constituent elements and their locations, shapes, and so forth are not limited to any of the structure for performing the methodology illustrated in the drawings.

For example, the image forming apparatus according to the embodiment of this disclosure is not limited to the image forming apparatus 1 that forms a color image. Alternatively, the image forming apparatus may be an image forming apparatus that forms a monochrome image. The image forming apparatus may be a copier, a printer, a facsimile machine, or a multifunction peripheral having two or more of copying, printing, and facsimile capabilities.

This disclosure has been described above with reference to specific embodiments. It is to be noted that this disclosure is not limited to the details of the embodiments described above, but various modifications and enhancements are possible without departing from the scope of the invention. It is therefore to be understood that this disclosure may be practiced otherwise than as specifically described herein. For example, elements, elements and/or features of different illustrative embodiments may be combined with each other and/or substituted for each other within the scope of this disclosure.

What is claimed is:

1. A drive transmission unit comprising:
   a drive source; and
   a rotatable drive transmitting member to transmit a driving force from the drive source, the rotatable drive transmitting member comprising:
      a circular recessed part including a tooth portion of an inner circumferential surface of the circular recessed part;
      a first circular projecting part dividing the circular recessed part into a plurality of recessed portions in a radial direction of the drive transmitting member, the first circular projecting part projecting in a first direction perpendicular to a direction of rotation of the drive transmitting member; and
      a second circular projecting part projecting in a second direction opposite the first direction,
   wherein an outer diameter of the second circular projecting part is relatively smaller than an inner diameter of the drive transmitting member and an inner diameter of the second circular projecting part is relatively larger than an outer diameter of the first circular projecting part, and
   wherein a difference between the inner diameter of the second circular projecting part and the outer diameter of the first circular projecting part is substantially equal to a difference between the inner diameter of the drive transmitting member and the outer diameter of the second circular projecting part.

2. The drive transmission unit according to claim 1, wherein the drive transmitting member further comprises a circular peripheral wall extending from a bottom part in the second direction along an axial direction of the drive transmitting member, and
   wherein the circular peripheral wall comprises an external toothed surface on an outer circumferential surface of the circular peripheral wall to mesh with a second member.

3. The drive transmission unit according to claim 1, wherein the drive transmitting member further comprises a circular peripheral wall extending from a bottom part in both the first direction and the second direction along an axial direction of the drive transmitting member, and
   wherein the circular peripheral wall comprises an external toothed surface on an outer circumferential surface of the circular peripheral wall to mesh with a second member.

4. The drive transmission unit according to claim 3, wherein the bottom part is positioned at an axial center of the external toothed surface in the axial direction of the drive transmitting member.

5. The drive transmission unit according to claim 1, further comprising a belt,
   wherein the drive transmitting member further comprises a circular peripheral wall extending from a bottom part in an axial direction of the drive transmitting member; and
   wherein the belt is wound around an outer circumferential surface of the circular peripheral wall to transmit the driving force from the drive source.

6. The drive transmission unit according to claim 5, wherein the circular peripheral wall extends from the bottom part in the second direction along the axial direction of the drive transmitting member.

7. The drive transmission unit according to claim 5, wherein the circular peripheral wall extends from the bottom part in both the first direction and the second direction along the axial direction of the drive transmitting member.

8. The drive transmission unit according to claim 1, further comprising a shaft,
   wherein the tooth portion of the inner circumferential surface of the circular recessed part meshes with one or more members via a plurality of meshing points, and
   wherein at least two of the plurality of meshing points are opposite each other with a rotation center of the drive transmitting member interposed between the at least two of the plurality of meshing points.

9. An image forming apparatus comprising the drive transmission unit according to claim 1.

10. An image forming apparatus comprising the drive transmission unit according to claim 8.

11. The drive transmission unit of claim 1, wherein the first and second circular projecting parts are circular stiffening ribs.

* * * * *